(12) United States Patent
Riihiaho et al.

(10) Patent No.: US 10,852,834 B2
(45) Date of Patent: Dec. 1, 2020

(54) HAPTIC SIGNALIZING DEVICE

(71) Applicant: AITO BV, Amsterdam (NL)

(72) Inventors: Jukka Riihiaho, Vantaa (FI); Turo Keski-Jaskari, Tuusula (FI)

(73) Assignee: AITO BV, Amsterdam (NL)

( * ) Notice: Subject to any disclaimer, the term of this patent is extended or adjusted under 35 U.S.C. 154(b) by 0 days.

(21) Appl. No.: 16/483,975

(22) PCT Filed: Feb. 5, 2018

(86) PCT No.: PCT/EP2018/052809
§ 371 (c)(1),
(2) Date: Aug. 6, 2019

(87) PCT Pub. No.: WO2018/141962
PCT Pub. Date: Aug. 9, 2018

(65) Prior Publication Data
US 2020/0026356 A1 Jan. 23, 2020

(30) Foreign Application Priority Data

Feb. 6, 2017 (EP) ...................... 17154896

(51) Int. Cl.
*G06F 3/01* (2006.01)
(52) U.S. Cl.
CPC .................... *G06F 3/016* (2013.01)
(58) Field of Classification Search
CPC ... G06F 3/016; H01H 13/85; H01H 2215/052
(Continued)

(56) References Cited

U.S. PATENT DOCUMENTS

2011/0043077 A1 2/2011 Yeh et al.
2011/0102341 A1* 5/2011 Imai ...................... G06F 3/041
345/173

(Continued)

FOREIGN PATENT DOCUMENTS

EP 3 065 029 A1 9/2016
WO WO 2012/098284 A1 7/2012
WO WO 2013/167683 A1 11/2013

OTHER PUBLICATIONS

International Search Report and Written Opinion for Application No. PCT/EP2018/052809 dated Mar. 13, 2018, 9 pages.
(Continued)

*Primary Examiner* — Hung T Nguyen
(74) *Attorney, Agent, or Firm* — Alston & Bird LLP

(57) ABSTRACT

A haptic signalizing device includes a number of piezoelectric elements arranged below a device surface such that mechanical deformations caused by the converse piezoelectric effect in the at least one piezoelectric element make the device surface to move such that the device surface follows the piezoelectric element. A driving circuit causes the converse the piezoelectric effect on the at least one piezoelectric element by generating an alternating electric field over the piezoelectric element in a bipolar fashion. The piezoelectric element is arranged i) to locally move the device surface inwards when the mechanical deformation in the piezoelectric element is a deflection directed away from the device surface, and ii) to locally move the device surface outwards when the mechanical deformation in the piezoelectric element is a deflection that is directed towards the device surface.

17 Claims, 9 Drawing Sheets

(58) Field of Classification Search
USPC .................. 340/407.1, 407.2; 345/156, 173; 310/311, 328
See application file for complete search history.

(56) References Cited

U.S. PATENT DOCUMENTS

| | | |
|---|---|---|
| 2011/0121765 A1 | 5/2011 | Anderson et al. |
| 2012/0075221 A1* | 3/2012 | Yasuda .................. H01L 27/20 345/173 |
| 2014/0340208 A1 | 11/2014 | Tan et al. |
| 2015/0034471 A1* | 2/2015 | Smith .................... H01H 13/85 200/5 A |
| 2016/0209922 A1 | 7/2016 | Kim et al. |

OTHER PUBLICATIONS

Partial Search Report for European Application No. 17154896.9 dated May 2, 2017, 14 pages.
Extended Search Report for European Application No. 17154896.9 dated Jun. 23, 2017, 16 pages.

* cited by examiner

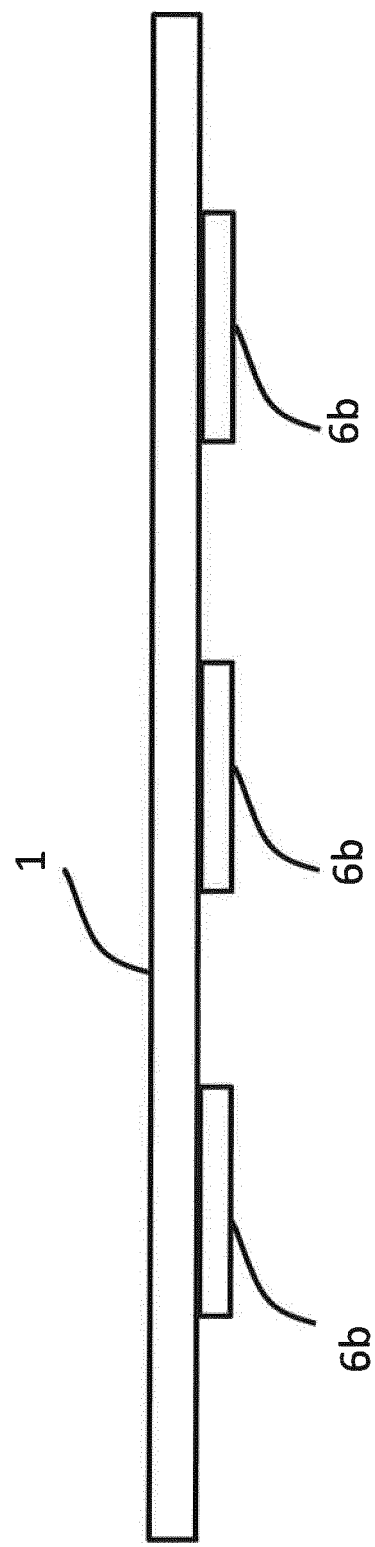

HAPTIC SIGNALIZING DEVICE

CROSS-REFERENCE TO RELATED APPLICATIONS

This application is a national phase entry of International Application No. PCT/EP2018/052809, filed Feb. 5, 2018, which claims priority to European Patent Application No. 17154896.9, filed on Feb. 6, 2017, the entire contents of which are incorporated herein by reference.

TECHNICAL FIELD

The embodiment relates to the field of haptic signalizing device.

TECHNICAL BACKGROUND

Piezoelectric elements are used in piezoelectric touch switches, as described in international patent application of the present applicant published under international publication number WO 2013/167683, for example. The piezoelectric effect causes the piezoelectric element to change polarization in the crystal lattice in response to mechanical stress, producing a measurable signal.

Piezoelectric elements are also used in signaling devices, as described in the international publication WO 2013/167683, to give a haptic signal through an overlay, which in the following will be referred to as piezo haptics. Piezo haptics is possible due to the converse piezoelectric effect, where the application of an electrical field over the crystal lattice creates a mechanical deformation in the crystal.

OBJECTIVES

A first objective may be to improve the haptic sensitivity of a haptic signalizing device in which a number of piezoelectric elements is used to generate a haptic signal through a device surface.

This objective can be fulfilled with a haptic signalizing device according to claim 1. The dependent claims describe advantageous aspects of the haptic signalizing device.

A second objective may be to improve the deployability of a haptic signalizing device in which a number of piezoelectric elements is used to generate a haptic signal through a device surface. This objective can be fulfilled with a haptic signalizing device according to independent claim.

A third objective may be to enable easing the manufacturing of a haptic signalizing device in which a number of piezoelectric elements is used to generate a haptic signal through a device surface. This objective can be fulfilled with a haptic signalizing device according to independent claim.

SUMMARY

According to an embodiment, a haptic signalizing device comprises: a number of piezoelectric elements arranged below a device surface such that mechanical deformations caused by the converse piezoelectric effect in the at least one piezoelectric element make the device surface to move such that the device surface follows the piezoelectric element.

A driving circuit configured to cause the converse piezoelectric effect on the at least one piezoelectric element by generating an alternating electric field over the piezoelectric element in a bipolar fashion, that is, consecutively in both the same and the opposite direction with respect to the polarization of the piezoelectric element, to make the piezoelectric element to move beyond its initial position consecutively in both directions. A depolarization limit is determined by the haptic signalizing device by using the piezoelectric element to detect when the electrical field, which is in the opposite direction with respect to the polarization of the piezoelectric element, starts to depolarize the piezoelectric element.

The driving circuit is configured to cause the converse piezoelectric effect on the at least one piezoelectric element by generating the alternating electric field over the piezoelectric element so that a magnitude of the component of the electrical field, which is driven to the opposite direction with the respect to the polarization, is based on the determined depolarization limit.

The driving circuit is configured to cause the converse piezoelectric effect on the piezoelectric element by generating the alternating electric field over the at least one piezoelectric element so that a magnitude of a component of the electric field, which is driven to the same direction with respect to the polarization, is based on a level where a short circuiting starts to occur at the piezoelectric element. According to an embodiment, the value need not be measured or detected. The maximum value may be obtained, for example, from a manufacturer's datasheet. It may be determined in the laboratory conditions as well. It may consequently operate as a general maximum value limit for different kind of piezoelectric elements used in the embodiment.

The depolarization limit may be based on the point where transduction efficiency starts to drop. The depolarization limit may be configured as a minimum voltage for the driving circuit so that the driving circuit is configured to maintain voltage above the minimum voltage when driving the piezoelectric element.

The component of the electric field, which is driven to the same direction with respect to the polarization, may be based on a level where breakage of insulation starts to occur at the piezoelectric element. The level where the short circuiting or the breakage starts to occur may be configured as a maximum voltage for the driving circuit so that the driving circuit is configured to maintain voltage below the maximum voltage when driving the piezoelectric element, or similar type of piezoelectric element.

According to an embodiment, the haptic signalizing device comprises a number of piezoelectric elements (i.e. at least one piezoelectric element) arranged below a device surface such that mechanical deformations caused by the converse piezoelectric effect in at least one piezoelectric element make the device surface to move such that the device surface follows the piezoelectric element. The haptic signalizing device further comprises a driving circuit configured to cause the converse piezoelectric effect on the at least one piezoelectric element by generating an alternating electric field over the piezoelectric element in a bipolar fashion, that is, consecutively in both the same and the opposite direction with respect to the polarization of the piezoelectric element, to make the piezoelectric element to move beyond its initial position consecutively in both directions.

The piezoelectric element is arranged a) to locally move the device surface inwards when the mechanical deformation in the piezoelectric element is a deflection directed away from the device surface, and b) to locally move the device surface outwards when the mechanical deformation in the piezoelectric element is a deflection that is directed towards the device surface.

The embodiment may be based on the idea that the piezoelectric element is used to locally move the device surface inwards (towards the piezoelectric element) when the mechanical deformation in the piezoelectric element is a deflection directed away from the device surface, and also to locally move the device surface outwards (further from the piezoelectric element) when the mechanical deformation in the piezoelectric element is a deflection that is directed towards the device surface. In this manner, the haptic sensitivity of the haptic signalizing device may be improved by directly driving the device surface by the piezoelectric element in both directions. Normally, the magnitude of the electric field is proportional to the deflection amplitude of the piezoelectric element in its normal operation temperature range. When the piezoelectric element is driven in a bipolar fashion, more charge (electrical energy) can be provided to the piezoelectric element compared to driving the piezoelectric element in a monopolar fashion.

The piezoelectric element and the device surface may be mechanically connected such that the device surface follows an inward movement of the piezoelectric element and/or even such that the following of the inward movement by the device surface is caused by mechanical connection between the device surface and the piezoelectric element. An advantage is that in this manner the haptic signalizing device will be able to directly drive the device surface by the piezoelectric element in both directions.

The mechanical connection between the device surface and the piezoelectric element may be implemented with adhesive. So the use of methods apt to damage the device surface (such as, welding or drilling) may be avoided. A further advantage is that, normally, applying adhesive can be carried out locally very efficiently even at a very small location.

The mechanical connection between the device surface and the piezoelectric element may also function as an electrical connection between the piezoelectric element and the driving circuit. This has as an advantage that the fault may so be detected with less effort since also the electrical connection will be lost when the mechanical connection gets lost. Since the absence/presence of the electrical connection may be detected in the haptic signalizing device by measuring impedance, for example, a further advantage is that the disappearance of the mechanical connection can so be made electrically detectable.

The haptic signalizing device may also comprise a further electrical connection between the piezoelectric element and the driving circuit, namely an electrically conductive carrier of the piezoelectric element. The electrically conductive carrier, in addition to supporting the piezoelectric element, can also be used as the electrical contact to the piezoelectric element. The electrically conductive carrier is much easier to electrically contact to the driving circuit in view of the movement of the piezoelectric element.

The haptic signalizing device may be configured to set the component of the electric field that is in the opposite direction with respect to the polarization of the piezoelectric element depending on temperature, such that in a lower temperature the component of the electric field is stronger and in a higher temperature the component of the electric field is weaker, preferably such that the weakening takes into account a temperature change, to keep the electric field over the piezoelectric element below a predetermined threshold. With the haptic signalizing device, even more charge can be provided to the piezoelectric element, since in lower temperatures the piezoelectric element can be driven with a stronger electric field against the polarization direction.

Preferably, the component of the electric field that is in the opposite direction with respect to the polarization of the piezoelectric element is kept at or below the depolarization limit of the piezoelectric element in each operating temperature, the depolarization limit preferably defined as the point at which rate of change of an electric current pumped to the piezoelectric element increases above a set or predetermined threshold. An advantage is that haptic sensitivity of the haptic signalizing device can be improved by utilizing the observed temperature dependency of the depolarization limit to obtain larger deflection amplitudes of the piezoelectric element in lower temperatures than in higher temperatures. The component of the electric field that is in the opposite direction with respect to the polarization of the piezoelectric element tends to depolarize the piezoelectric element. Depolarization reduces the transduction efficiency from electrical energy to movement significantly, causing loss of the transducing function of the piezoelectric element. In addition to the loss of energy, depolarization also shortens the lifetime of the piezoelectric element.

According to an embodiment, when the depolarization limit is reached, the current required to pump into the piezoelectric element increases at higher pace than pre-defined, compared to the voltage change measured. For example, the device should pump more current or charge into the piezoelectric element, than a linear capacitive load would require, in order to see the linear voltage increase. Or if monitoring the voltage-rate-of-change with predefined pace of current or charge pumping rate into the piezoelectric element, one may see lower voltage-rate-of-change, that would be seen with linear capacitive loading. The non-linear behavior and the need more current or charge to certain voltage change, is caused by the depolarization effect, when part of the energy is wasted to repolarize the piezo element.

The depolarization limit may be determined by the haptic signalizing device by using the piezoelectric element to measure its mechanical deformations for determining the magnitude of the component of the electrical field that is in the opposite direction with respect to the polarization of the piezoelectric element based on or as the point where the transduction efficiency starts to drop. Preferably, the mechanical deformations are measured by measuring the voltage over the piezoelectric element, which correlates with the mechanical deformation.

The haptic signalizing device may be calibrated in the prevailing operating temperature before use, especially to compensate temperature change in stiffness or elasticity of the device surface in the haptic signalizing. The advantage is that the haptic signalizing can be made more constant over a wider temperature range, thus improving user experience.

The piezoelectric element may be driven by at least one booster controlled by the driving circuit, the drive circuit preferably comprising a number of capacitors and controllable switches that can be opened and closed by the driving circuit.

The piezoelectric signalizing device may comprise at least one booster controllable by the driving circuitry for generating an alternating electric field over the piezoelectric element in the same direction with respect to the polarization of the piezoelectric element, and at least one further booster controllable by the driving circuit for generating an alternating electric field over the piezoelectric element in the opposite direction with respect to the polarization of the piezoelectric element, the driving circuit preferably comprising a number of capacitors and controllable switches that can be opened and closed by the driving circuit.

The piezoelectric signalizing device may comprise one booster controllable by the driving circuit for generating an alternating electric field over the piezoelectric element in both the same and the opposite direction with respect to the polarization of the piezoelectric element, the driving circuit preferably comprising a number of capacitors and controllable switches that can be opened and closed by the driving circuit.

The haptic signalizing device may be configured such that the piezoelectric element moves the device surface by locally bending it.

The haptic signalizing device further comprises a further surface laterally surrounding the device surface and the haptic signalizing device is configured such that the piezoelectric element moves the device surface following the piezoelectric element by locally moving it back and forth with respect to the further surface.

The mechanical deformations are preferably measured as a feedback signal in a microcontroller via its analog-to-digital converter and the feedback signal can then be compared to previously stored values.

Alternatively or in addition to this, the mechanical deformations may be measured as the current through and/or voltage across the piezoelectric element by a microcontroller via its analog-to-digital converter and the measured voltage and/or current can then be compared to previously stored values.

The haptic signalizing device may, before use, be calibrated in the prevailing operating temperature. This enables improving the haptic sensitivity at each temperature by maximizing the deflection amplitude of the piezoelectric element in each operating temperature.

The haptic signalizing device according to the second aspect comprises:
- a number of piezoelectric elements arranged below a device surface such that mechanical deformations caused by the converse piezoelectric effect in at least one piezoelectric element make the device surface to move such that the device surface follows the piezoelectric element; and
- a driving circuit configured to cause the converse piezoelectric effect on the at least one piezoelectric element by generating an alternating electric field over the piezoelectric element to make the piezoelectric element to move beyond its initial position.

The haptic signalizing device is configured to adapt the alternating electric field over the piezoelectric element depending on temperature, preferably to obtain a larger haptic signal from the haptic signalizing device in lower temperatures than from higher temperatures or to compensate for temperature change in stiffness or elasticity of the device surface in the haptic signalizing.

The haptic signalizing device according to the third aspect comprises:
- a number of piezoelectric elements arranged below a device surface such that mechanical deformations caused by the converse piezoelectric effect in at least one piezoelectric element make the device surface to move such that the device surface follows the piezoelectric element; and
- a driving circuit configured to cause the converse piezoelectric effect on the at least one piezoelectric element by generating an alternating electric field over the piezoelectric element to make the piezoelectric element to move beyond its initial position.

The haptic signalizing device is configured to calibrate the piezoelectric element before use.

LIST OF DRAWINGS

In the following, the haptic signalizing device is explained more detail by way of examples shown in attached drawings in FIG. 1 to 9 and the exemplary flow diagram in attached drawing FIG. 5.

Of the attached drawings:

FIG. 10 illustrates multiple piezoelectric elements that are providing haptic effect to a surface.

Same reference numerals refer to same technical components in all FIG.

DETAILED DESCRIPTION

Figure 1:
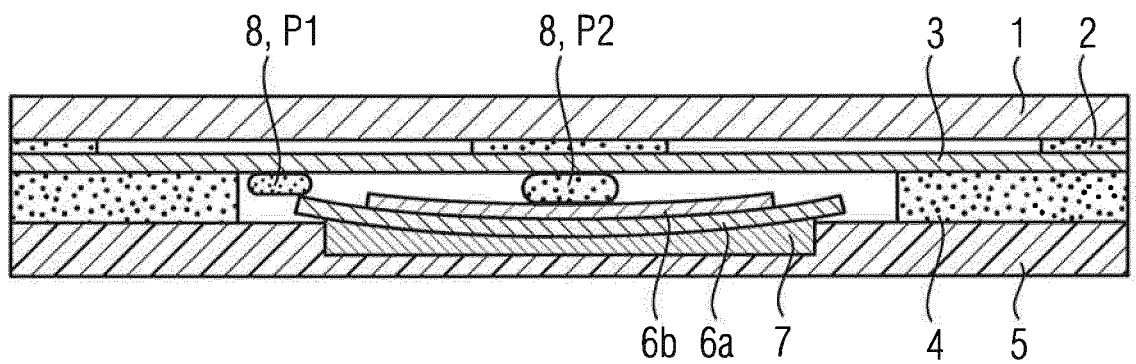
FIG. 1 illustrates the stacking of piezoelectric element below a device surface in a haptic signalizing device.

According to an embodiment, a haptic signalizing device comprises: a number of piezoelectric elements arranged below a device surface such that mechanical deformations caused by the converse piezoelectric effect in the at least one piezoelectric element make the device surface to move such that the device surface follows the piezoelectric element.

A driving circuit configured to cause the converse piezoelectric effect on the at least one piezoelectric element by generating an alternating electric field over the piezoelectric element in a bipolar fashion, that is, consecutively in both the same and the opposite direction with respect to the polarization of the piezoelectric element, to make the piezoelectric element to move beyond its initial position consecutively in both directions. A depolarization limit is determined by the haptic signalizing device by using the piezoelectric element to detect when the electrical field, which is in the opposite direction with respect to the polarization of the piezoelectric element, starts to depolarize the piezoelectric element.

The driving circuit is configured to cause the converse piezoelectric effect on the at least one piezoelectric element by generating the alternating electric field over the piezoelectric element so that a magnitude of the component of the electrical field, which is driven to the opposite direction with the respect to the polarization, is based on the determined depolarization limit.

The driving circuit is configured to cause the converse piezoelectric effect on the piezoelectric element by generating the alternating electric field over the at least one piezoelectric element so that a magnitude of a component of the electric field, which is driven to the same direction with respect to the polarization, is based on a level where a short circuiting starts to occur at the piezoelectric element.

The movement or the amplitude of the piezoelectric element, which provides the haptic effect, may be increased or maximized.

The surface may be directly driven by the piezoelectric element so that the surface is moved directly by piezoelectric element. Piezoelectric element may substantially, such as 95%, follow the surface only mechanical issue needed. Intensity may be improved. Very large signals, such as having high amplitude and/or high voltage, may be driven because of the mechanical direct drive and determination of the polarization limit and the short circuiting limit. Consequently the amplitude of the movement of the piezoelectric element may be maximized. Haptic effect can be improved. The movement may also stop when driving signal stops.

There may be multiple piezoelectric elements and the whole surface is moving accordingly.

The driving signal may be at first negative voltage and then driven to positive voltage values. Large signals, such as between limits of −140 volts up to +400 volts may be applied. According to an embodiment, another prefix values may be used such as 100V to 350V. The selection of the lower and upper value may be based on the determination or selection of the upper and lower limits accordingly. However, the driven signal is based on the lower and upper limits but not necessarily identical to these limits. Driving the signal and its magnitude is based on knowing the limits. Once the limits are obtained, the signal may be driven accordingly, at least within these limits. The signal magnitude and amplitude may be increased up to these limits.

Effective transduce of the electricity into the haptics may be achieved.

Figure 2:
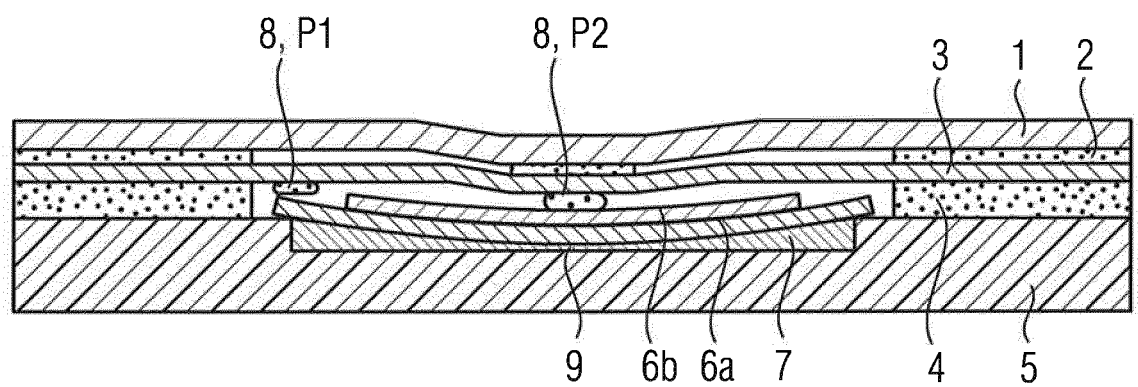
FIG. 2 illustrates the bending of the piezoelectric element away from the device surface, locally bending the device surface inwards.

FIGS. 1 and 2 illustrate the working principle of a haptic signalizing device 10.

The haptic signalizing device 10 comprises a number of (in other words, at least one) piezoelectric elements 6b arranged below a device surface 1 such that mechanical deformations caused by the converse piezoelectric effect in the at least one piezoelectric element 6b make the device surface 1 to move such that the device surface 1 follows the piezoelectric element 6b.

The haptic signalizing device 10 further comprises a driving circuit 20, 30 configured to cause the converse piezoelectric effect on the at least one piezoelectric element 6b by generating an alternating electric field over the piezoelectric element 6b in a bipolar fashion, that is, consecutively in both the same and the opposite direction with respect to the polarization of the piezoelectric element 6b, to make the piezoelectric element 6b to move beyond its initial position consecutively in both directions. Examples of suitable driving circuits will be discussed below in the context of FIGS. 3, 4, 6 and 8.

The piezoelectric element 6b is arranged:
to locally move the device surface 1 inwards when the mechanical deformation in the piezoelectric element 6b is a deflection directed away from the device surface 1, and
to locally move the device surface 1 outwards when the mechanical deformation in the piezoelectric element 6b is a deflection that is directed towards the device surface 1.

The piezoelectric element 6b and the device surface 1 are mechanically connected such that the device surface 1 follows an inward movement of the piezoelectric element 6b.

The following of the inward movement of the piezoelectric element 6b by the device surface 1 is advantageously caused by the mechanical connection between the device surface 1 and the piezoelectric element 6b. The mechanical connection between the device surface 1 and the piezoelectric element 6b is preferably implemented with adhesive 2, 4, 8.

In FIGS. 1 and 2, there is adhesive 2 between the device surface 1 and a conductive layer 3 and there is also adhesive 4 between the conductive layer 3 and a carrier 5 to which the piezoelectric element 6b is supported via its electrically conductive carrier 6a.

In the movement to one direction, the adhesive 8 on the piezoelectric element 6b pulls the device surface 1 downwards into the opening 7 which acts as a deflection space allowing the downwards bending of the piezoelectric element 6b and of its electrically conductive carrier 6a. The electrically conductive carrier 6a may in principle move up to the contact point 9 such that the electrically conductive carrier 6a touches the carrier 5.

In the movement to the other direction, the adhesive 8 on the piezoelectric element 6 pushes the device surface 1 upwards away from the opening 7.

Preferably, a mechanical connection between the device surface 1 and the piezoelectric element 6b also functions as an electrical connection P2 between the piezoelectric element 6b and the driving circuit 20, 30. Similarly, there is preferably a further electrical connection P1 between the piezoelectric element 6b and the driving circuit 20, 30, namely an electrically conductive carrier 6a of the piezoelectric element 6b.

The adhesive 8 between the conductive layer 3 and the piezoelectric element 6b preferably functions as the electrical connection P2 between the piezoelectric element 6b and the driving circuit 20, 30. Respectively, the further electrical connection P1 between the piezoelectric element 6b and the driving circuit 20, 30 is most practically located on the electrically conductive carrier 6a of the piezoelectric element 6b.

The haptic signalizing device 10 is preferably configured such that the piezoelectric element 6b moves the device surface 1 by locally bending it. Alternatively, the haptic signalizing device 10 may further comprise a further surface laterally surrounding the device surface 1. In this case, the haptic signalizing device 10 is preferably configured such that the piezoelectric element 6b moves the device surface 1 following the piezoelectric element 6b by locally moving it back and forth with respect to the further surface.

FIG. 10 illustrates a number of piezoelectric elements 6b and the device surface 1. According to an embodiment, there may be a number of piezoelectric elements 6b that are providing the haptic effect to the single device surface 1. The piezoelectric elements 6b may be driven individually. The piezoelectric elements 6b may also be driven synchronously so that they provide commonly the haptic effect. The whole surface 1 may be moving depending on the respective piezoelectric element 6b.

Figure 3:
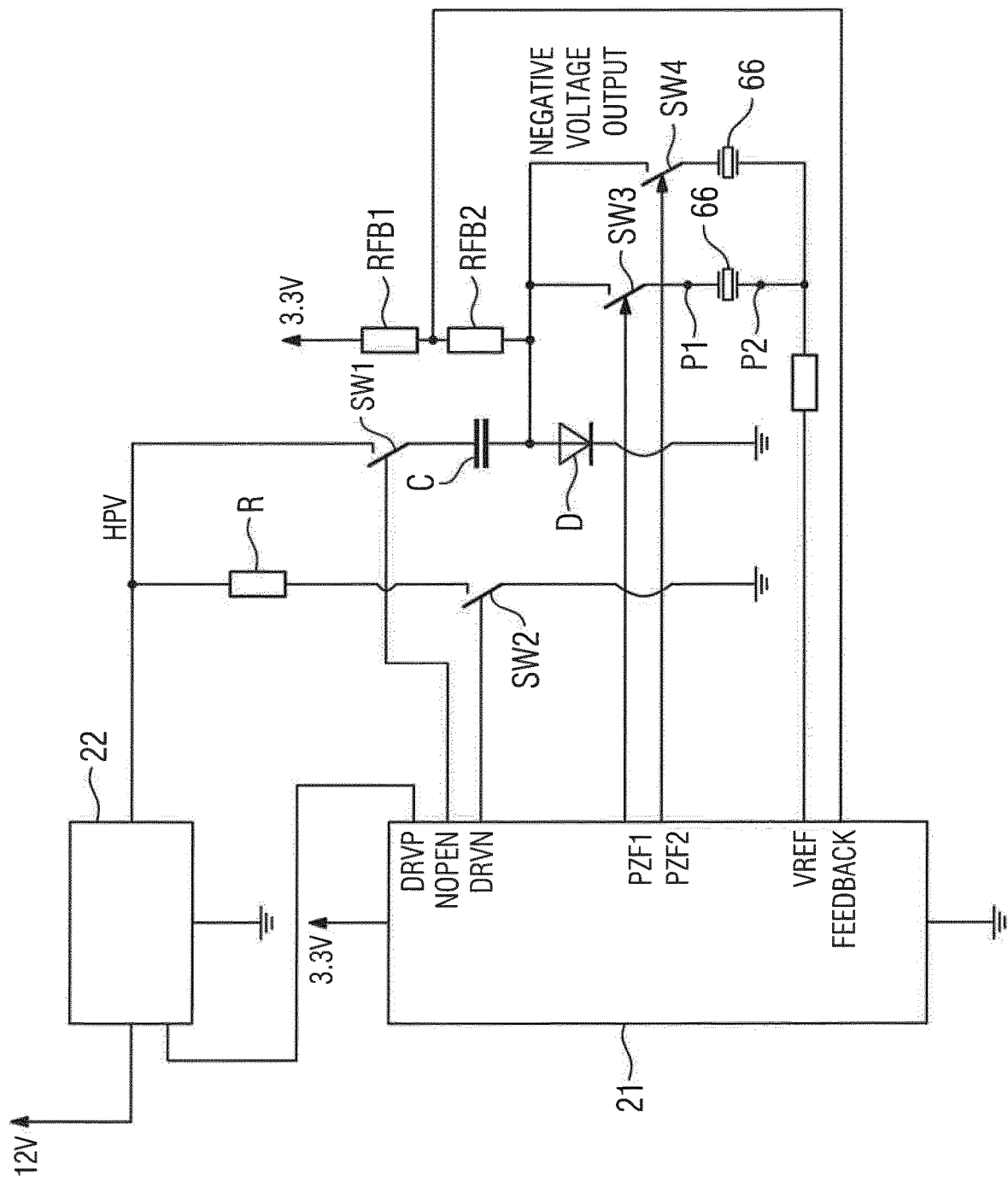
FIG. 3 is a diagram illustrating a first possible modification in the drive circuit known in background art in order to generate an alternating electric field also in the opposite direction with respect to the polarization of the piezoelectric element.
Figure 4:
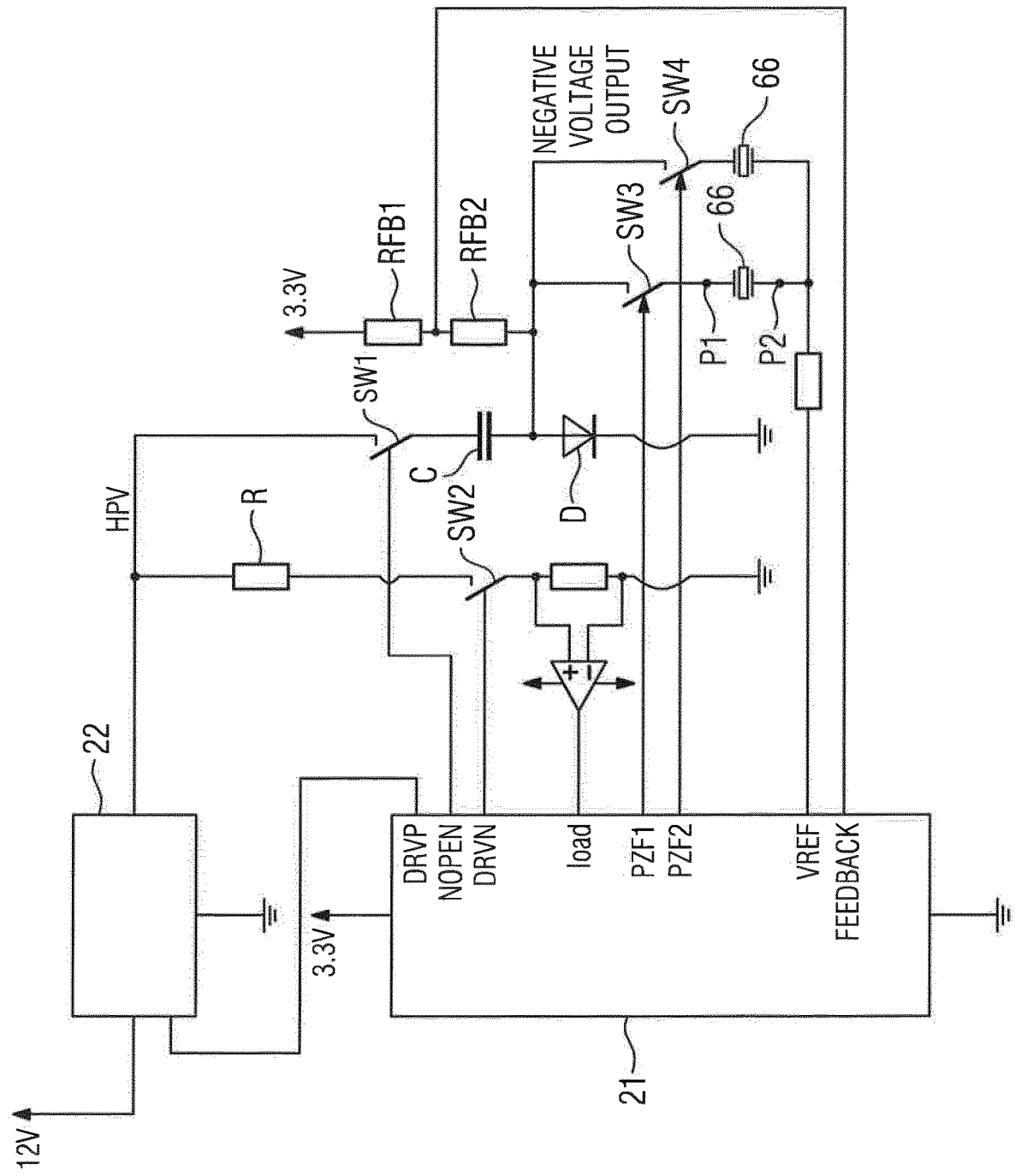
FIG. 4 is a diagram illustrating a second possible modification in the drive circuit known in background art in order to generate an alternating electric field also in the opposite direction with respect to the polarization of the piezoelectric element.

FIG. 3 shows a first driving circuit 20 and FIG. 4 shows a second driving circuit 30, both comprising a flip circuit. Both driving circuits 20, 30 are configured to cause the converse piezoelectric effect on the at least one piezoelectric element 6b by generating an alternating electric field over the piezoelectric element 6b in a bipolar fashion, that is, consecutively in both the same and the opposite direction with respect to the polarization of the piezoelectric element 6b.

The piezoelectric element 6b is driven by at least one booster 22 controlled by the driving circuit 20, 30. Most preferably, the driving circuit 20, 30 comprises a booster 22 that is a positive booster, and a controllable capacitive charge pump (preferably implemented with a number of capacitors and controllable switches that are controlled by the microcontroller 21), connected at the output of the booster 22, to flip the boosted voltage (such as, from positive to negative), and to further control it. So it is not necessary to have two separate boosters even though two or even more separate boosters could be used. The flip circuit and respective control by the microcontroller 21 have been added to the driving circuit disclosed WO 2013/167683.

Figure 8:
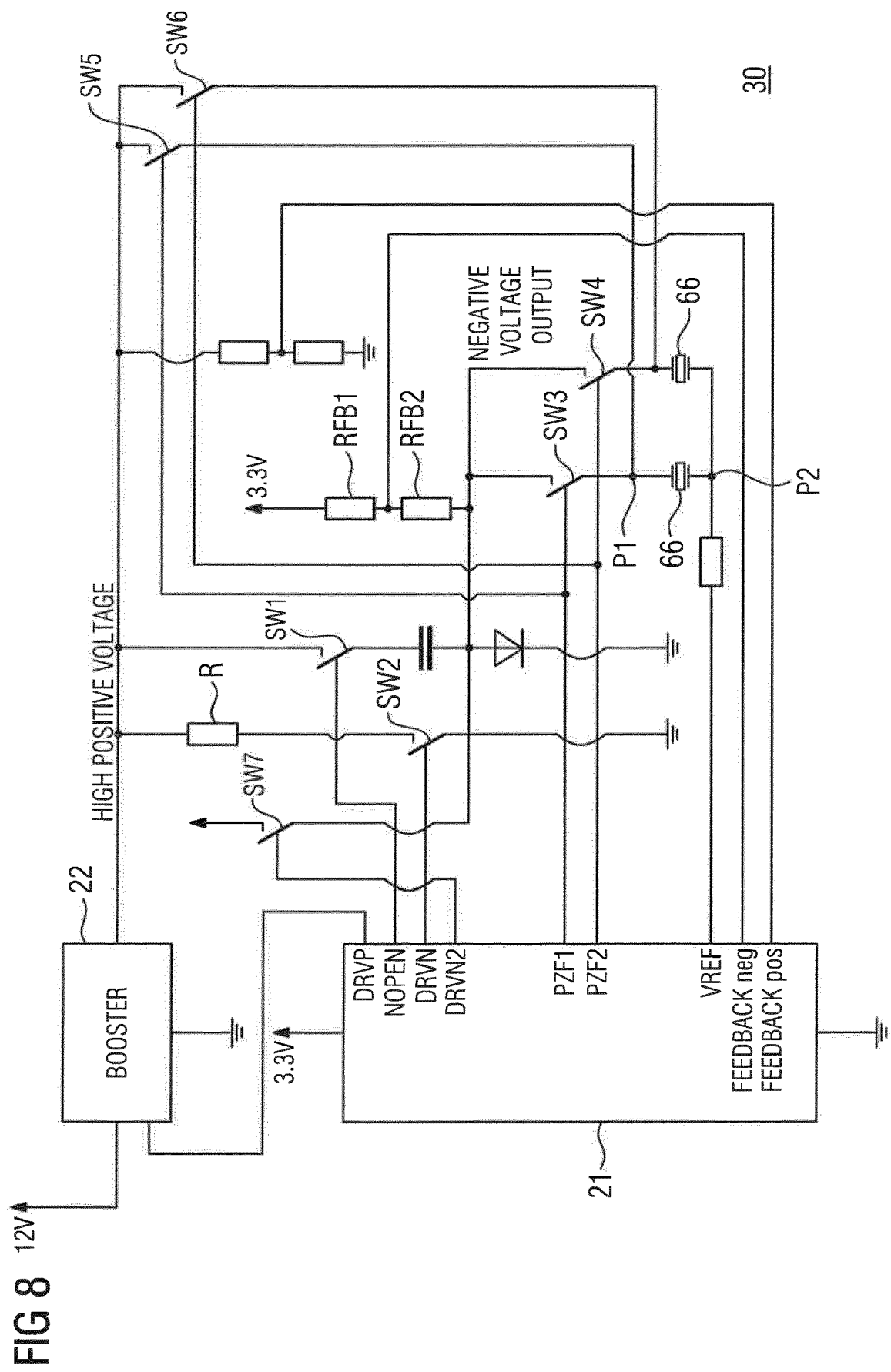
FIG. 8 is a circuit diagram illustrating a drive circuit that can generate an alternating electric field in the same and in the opposite direction with respect to the polarization of the piezoelectric element with one booster only.

FIG. 8 illustrates the driving circuit 30 comprising a further embodiment of a flip circuit that can be used to obtain from the booster 22 both negative and positive voltage over the at least one piezoelectric element 6b.

Generally, there may be at least one booster 22 for generating an alternating electric field over the piezoelectric element 6b in the same direction with respect to the polarization of the piezoelectric element 6b, and at least one further booster for generating an alternating electric field over the piezoelectric element 6b in the opposite direction with respect to the polarization of the piezoelectric element 6b, preferably such that the driving circuit 20, 30 comprise in addition to the boosters 22 a number of capacitors and controllable switches that can be opened and closed by the driving circuit 20, 30.

However, preferably, there may be one booster 22 controllable by the driving circuit 20, 30 for generating an alternating electric field over the piezoelectric element 6b in both the same and the opposite direction with respect to the polarization of the piezoelectric element 6b, the driving circuit 20, 30 preferably comprising a number of capacitors and controllable switches that can be opened and closed by the driving circuit 20, 30.

The haptic signalizing device 10 may be configured to set the component of the electric field that is in the opposite direction with respect to the polarization of the piezoelectric element 6b depending on temperature, such that in a lower temperature the component of the electric field is stronger and in a higher temperature the component of the electric field is weaker.

The component of the electric field that is in the opposite direction with respect to the polarization of the piezoelectric element 6b is kept at or below the depolarization limit of the piezoelectric element 6b in each operating temperature.

The term depolarization limit of the piezoelectric element 6b is not a physical parameter normally defined by a piezoelectric element manufacturer nor by the material of which the piezoelectric element 6b is made of, or something that could be easily defined as one fixed (opposite voltage) value. In this embodiment we use a de-polarization threshold definition described for example in FIG. 5, which is based on applying an increasing voltage having a direction opposite to the polarization of the piezoelectric element, and monitoring the change of the transduction effect of the element. The depolarization phenomenon and the voltage required for it is detected from the change of the charge-to-voltage conversion at the element, according to the exemplary algorithm of FIG. 5.

The depolarization limit preferably defined as the point at which rate of change of an electric current pumped to the piezoelectric element 6b increases above a set or predetermined threshold i.e. as the point where the transduction efficiency starts to drop. The depolarization limit may be determined by the haptic signalizing device 10 by using the piezoelectric element 6b to measure its mechanical deformations for determining the magnitude of the component of the electrical field that is in the opposite direction with respect to the polarization of the piezoelectric element 6b.

The haptic signalizing device 10 can even be configured to calibrate itself in the prevailing operating temperature before use.

For piezo haptics there is only a limited haptic pulse energy available when using simple and low cost mono or bimorph piezo components or piezoelectric elements consisting a layer of piezoelectric material attached to an electrically conductive carrier (such as a metal plate).

In the context of this application, with a piezoelectric element we mean either a piezo component or a piezoelectric element. Both are above and in the following referred to as the piezoelectric element 6b.

In order to maximize the haptic pulse energy, the amount of charge (electrical energy) provided to the piezoelectric element 6b should be maximized. However, the charge should be effectively transduced to mechanical movement without losing much of the electrical energy to losses.

The piezoelectric element 6b can be driven for actuation purposes by an electric field across the piezoelectric element 6b by a bipolar drive. i.e. in both same and opposite direction in respect to the polarization of the piezoelectric element 6b. The magnitude of the electric field is proportional to the deflection amplitude of the piezoelectric element 6b in the normal operation range. By driving the electric field to same direction with respect to the polarization allows to use much higher electric fields, in practice up to the level of breakage of the insulation, where short circuiting occurs. Driving the electric field in the opposite direction with respect to the polarization of the piezoelectric element 6b is limited to the depolarization limit i.e. to the limit where the opposite electric field starts to depolarize the piezoelectric element 6b. The depolarization lowers the transduction efficiency from electrical energy to movement significantly which causes loss of the transducing function of the piezoelectric element 6b.

The haptic signalizing device 10 enables maximizing the haptic pulse energy in different operating temperatures without causing a significant reduction in the transduction efficiency.

Each of the driving circuits 20, 30 may be suited to individually monitor the depolarization limit of the at least one piezoelectric element 6b in the haptic signalizing device 10. Instead of or in addition to this, each of the driving circuits 20, 30 may be suited to calibrate the component of the electric field that is in the opposite direction with respect to the polarization of the respective piezoelectric element 6b.

This allows driving each piezoelectric element 6b in a bipolar fashion with a maximal electric field and thus enables maximizing the deflection for haptics. The determination and calibration of the depolarization limit can be made in different operation conditions, such as in the prevailing temperature before use.

In the driving circuit 20, a microcontroller 21 sends a drive signal DRVP to a booster 22. In response to the drive signal DRVP, the booster 22 generates a high positive voltage HPV, such as in the range of 400 V DC.

When the switch SW1 (controlled by the microcontroller 21) is open, the capacitor C is neither charged nor discharged. This changes as soon as the switch SW1 is closed.

Given the high positive voltage HPV is present (requiring drive signal DRVP being present as already explained), the capacitor C is either charged (if the switch SW2 is closed; the switch SW2 is controlled by the microcontroller 21) or discharged (if the switch SW2 is open). The capacitor C essentially does not let a constant voltage current to pass but blocks it.

A. Procedure of driving first a negative, then a positive waveform to the at least one piezoelectric element 6b:

1. The microcontroller 21 closes switch SW1 and opens switches SW2 to SW7.
2. Charge the negative potential storage (booster 22): drive BOOST output to the desired positive voltage, e.g. 400V, by DRVP of the microcontroller 21.
   Switch SW1 is conductive, thus the capacitor C under SW1 gets charged into 400V: top plate is at Vboost400V, bottom plate is at ground via the diode D.
   after reaching 400V (measured by the right hand side resistive feedback at FEEDBACKpos), stop BOOST, and let it be in high output impedance state, thus not charging nor discharging. This allows the 'HIGH POSITIVE VOLTAGE' node to be driven to any potential (driven by SW2 in #4 below)
3. To select which piezoelectric element 6b is to drive the neg waveform, connect either SW3 or SW4. E.g., to drive into the left piezo, change the state of SW3 to conductive (SW4 for right piezoelectric element 6b), and keep the SW1 conductive, keep the SW4 to SW7 non-conductive (SW3, SW5 to SW7 for right piezoelectric element 6b). There may be more piezoelectric elements 6b than two, or there may be only one piezoelectric element 6b.
4. Drive the neg waveform into the selected (e.g. left) piezoelectric element 6b by making SW2 conductive for short periods, and measuring after each period, if the negative voltage signal at (left hand side) resistive feedback: (FEEDBACKneg), reaches the desired value of voltage at the time point. The resistor R in series with the switch SW2 limits the pulldown strength of the switch SW2, not to generate a too steep negative waveform. The waveform is preferably predefined as [time:voltage]—pairs in a reference function inside the microcontroller 21.
   4.1 Driving downwards: towards deeper negative voltage:
   if the negative voltage lags the desired waveform, pulse more periods/longer periods with switch SW2
   if the negative volt exceeds the desired waveform, stop pulsing switch SW2 or slow pulse pace or pulse duration
   4.2 Driving upwards: after negative peak, towards zero volt again:
   disconnect switch SW1 and switch SW2, keep the switch SW3 conductive (selects the piezoelectric element 6b to be driven)
   when driving upwards from the negative peak of the negative waveform, pulse DRVN2 for switch SW7 alike switch SW2 was pulsed downwards, and monitor FEEDBACKneg to follow the reference waveform
   after FEEDBACKneg reaches desired end value of the negative waveform, stop pulsing switch SW7: negative waveform completed
5. Drive a positive waveform into the same piezoelectric element 6b after the negative waveform. Disconnect switch SW3, connect switch SW5, to select the (e.g. left) piezoelectric element 6b to be driven into positive (waveform).
6. Drive BOOST output according to the desired positive waveform (by DRVP). The conductive switch SW5 makes the left piezoelectric element 6b to follow that voltage (at 'HIGH POSITIVE VOLTAGE node)
   6.1 Driving upwards: towards higher positive voltage:
   drive the BOOST up to positive peak voltage following the desired waveform
   after reach positive peak, stop BOOST and let it be in high output impedance state, thus not charging nor discharging. This allows the 'HIGH POSITIVE VOLTAGE' node to be driven to any potential (driven by switch SW2) next
   6.2 Driving downwards: towards zero again:
   pulse switch SW2 again with short periods, to take the 'HIGH POSITIVE VOLTAGE' node down according to the reference waveform shape. The switch SW5 conducting takes the (left) piezoelectric element 6b down at the same pace. Monitor the waveform shape via right hand side resistive feedback at FEEDBACKpos, and control DRVN accordingly
   after reach desired end value of the positive waveform, stop pulsing switch SW2: positive waveform completed FIG. 6 is a symbolic schematic of a possible circuit (that is preferably an integrated circuit) that can create both positive and negative piezo voltages using only a positive booster 22 but no charge pump.

Figure 6:
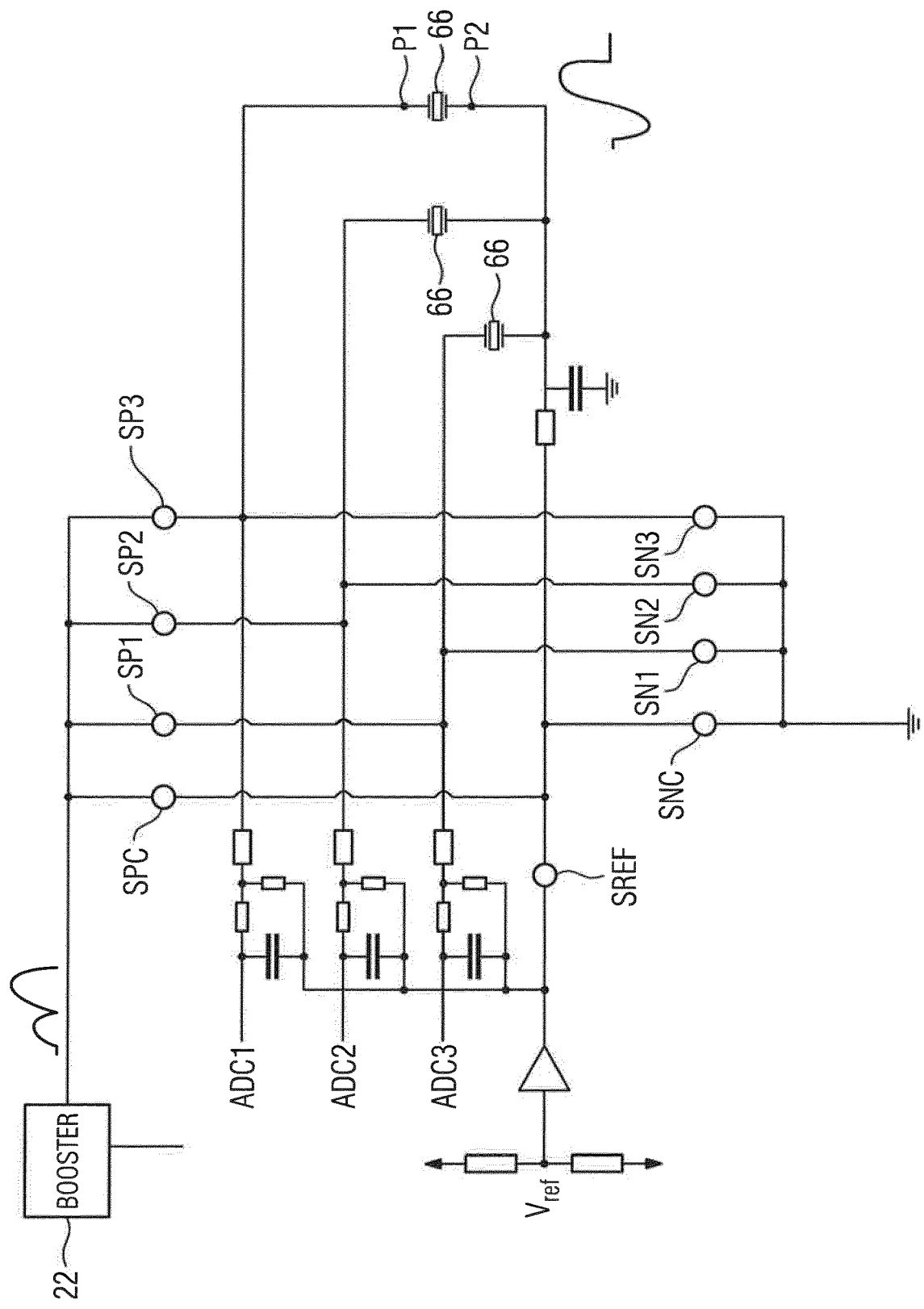
FIG. 6 is a circuit diagram illustrating a drive circuit that can generate an alternating electric field in the same and in the opposite direction with respect to the polarization of the piezoelectric element, illustrating over time the preferred voltage waveform to generate the alternating electric field.
Figure 7:
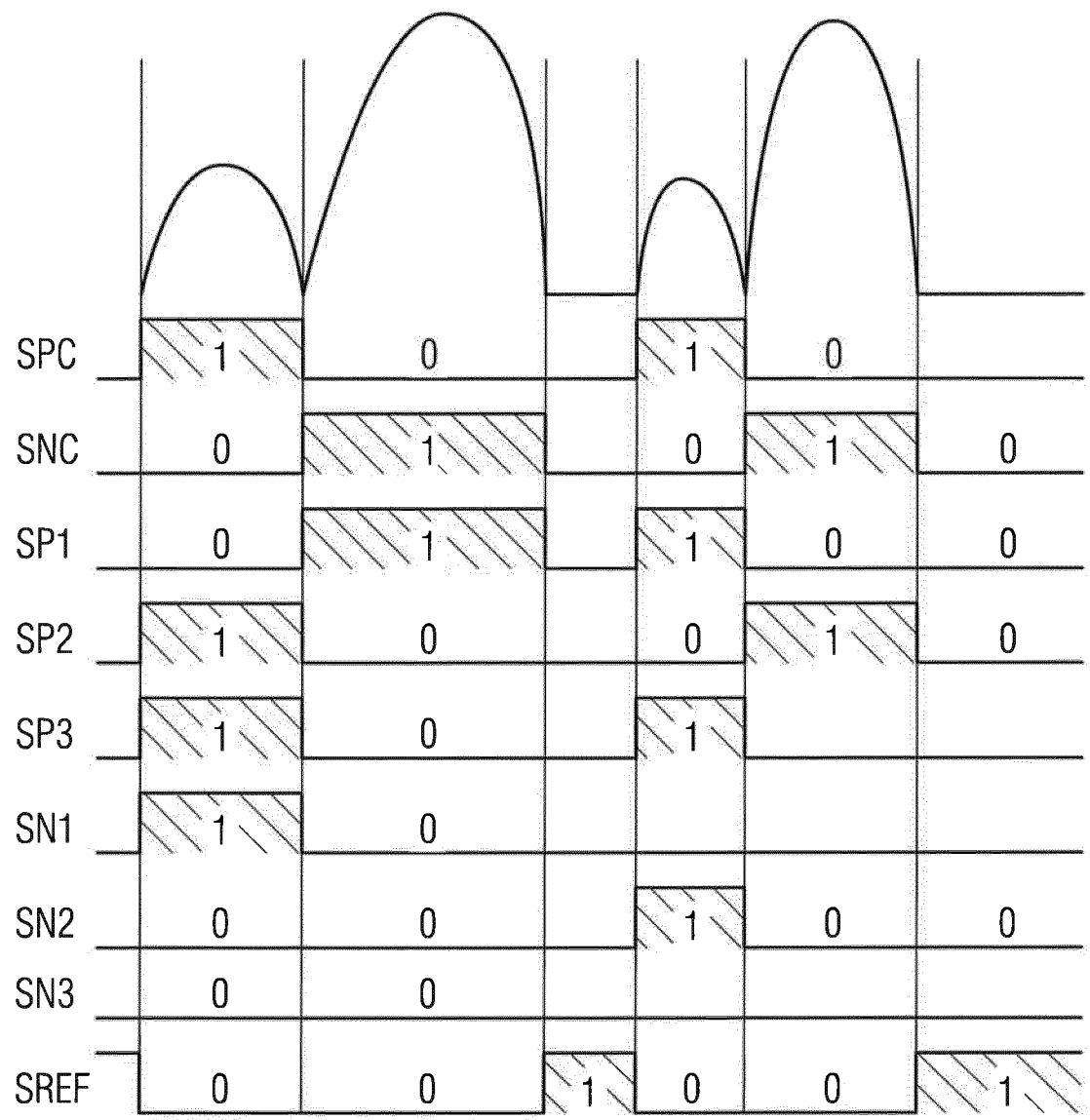
FIG. 7 illustrates the switching sequences of the drive circuit shown in FIG. 6.

FIG. 7 illustrates the switching sequence of FIG. 6.

Figure 9:
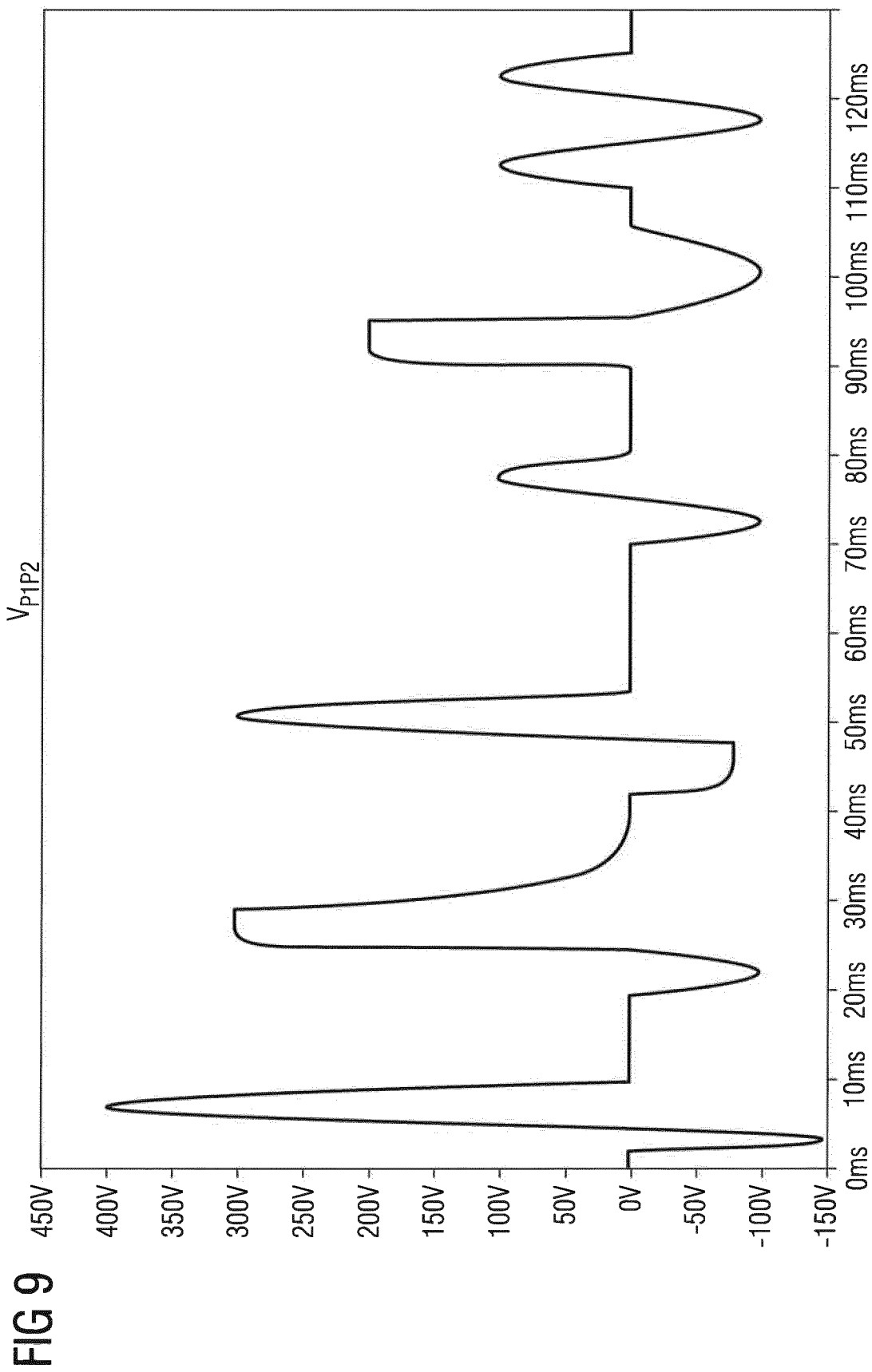
FIG. 9 illustrates simulated voltage waveform from the drive circuit over the piezoelectric element over time.

FIG. 9 shows simulated coarse waveforms (voltage $V_{P1P2}$ over the piezoelectric element 6b between electrical connections P1 and P2) of possible pos/neg and neg/pos pulses for the driving circuit 20, 30 of the haptic signalizing device 10 under development at the time of writing.

B. Procedure of driving first positive, then negative waveform to the at least one piezoelectric element 6b:

Same principle as neg/pos, but while first driving positive to the piezoelectric element 6b (via switch SW5 or switch SW6), keep the switch SW1 conductive during the rising period of the positive waveform, to store the energy at the capacitor C for the following negative waveform (driven by switch SW2, switch SW3/SW4, switch SW7).

Figure 5:
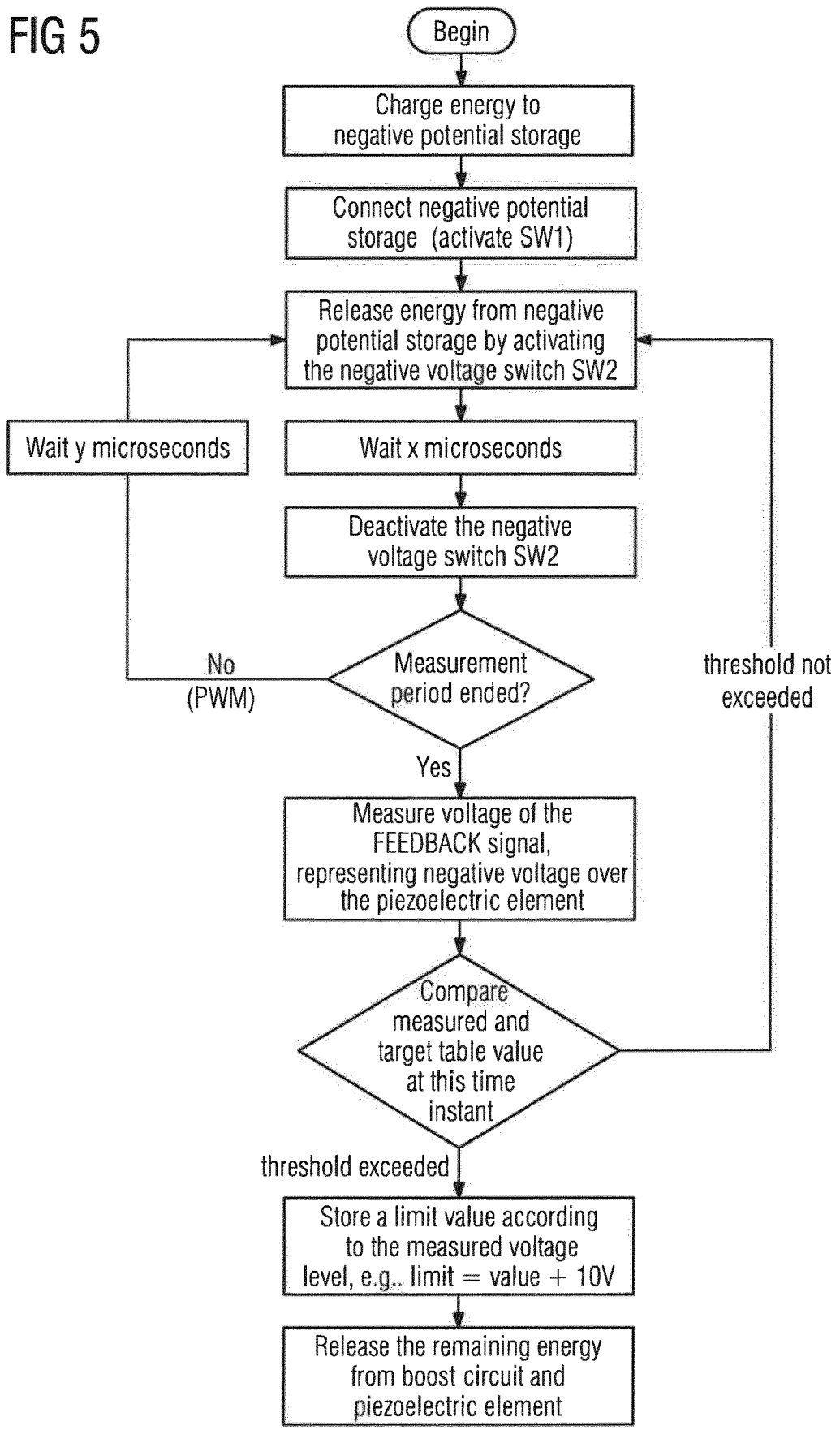
FIG. 5 is a flow diagram illustrating the method for determining the depolarization limit of a piezoelectric element and setting the component of the electrical field that is in the opposite direction in respect to the polarization of the piezoelectric element.

C. Procedure of detecting/measuring the depolarization (or repolarization) level of the piezo:

FIG. 5 is a flow diagram illustrating the method for determination of the depolarization limit of a piezoelectric element 6b, and setting the component of the electrical field that is in the opposite direction in respect to the polarization of the piezoelectric element 6b. The algorithm of FIG. 5 is suited for drive circuit 30 but can be modified to be used with drive circuit 20.

First the negative charge reservoir (booster 22) needs to be activated by opening the switch SW1. Then negative charge is driven to the piezoelectric element 3 periodically by opening and closing the switch SW2 for a known time period y, resulting in a negative voltage across the piezoelectric element 6b which is measured as FEEDBACK signal in microcontroller 21 by its analog-to-digital converter.

The measured value (FEEDBACK signal) is compared to predetermined table values. The table values correspond to the response of the piezoelectric element 6b to the drive period y without depolarization. If the comparison shows that the measured value (FEEDBACK signal) deviates more than a predetermined threshold value DEVIATION THRESHOLD from a respective tabled value, then the microcontroller 21 determines that depolarization threshold has been exceeded and stores the new threshold value for the negative drive voltage. Obviously, the table values may be set to lead the driving further to the negative than the lowest expected depolarization threshold, since it may be possible that the depolarization phenomenon or threshold will not be detected unless the negative drive voltage goes far enough to the negative.

A new threshold value for the negative drive voltage can be determined by adding a predefined voltage (such as 10 V) to ensure that depolarization will be avoided in normal operation.

In the driving circuit 20 shown in FIG. 2, the current across the piezoelectric element 6b is measured (between resistors RFB2 and RFB1 to scale down the current) as the FEEDBACK signal and compared to tabled values by the microcontroller 21 to determine when depolarization starts to occur. The microcontroller 21 further stores the threshold value for maximum negative electric field allowed, when driving bipolar haptics signal the piezoelectric element 6b.

The tabled comparison values can be also calculated in microcontroller 21 or, alternatively, sent to a remote microcontroller by a host via a communication bus or they can be known predetermined values stored permanently in the memory of the microcontroller 21.

The maximum negative drive signal can be determined individually to the at least one piezoelectric element 6b and it can be determined each time when the haptic signaling device 10 is used, such as when user interface operation is initiated. Thus, also the determination can be made in different environmental conditions Drive pump-feedback values may be compared to tabled target values. When the difference exceeds certain threshold, the maximum negative voltage level is determined and not exceeded in normal operations.

The haptic signalizing device 10 works when the drive circuit 20, 30 has a limited capability to drive the piezoelectric element 6b, i.e. an increase of losses causes a change of the rate increasing voltage across the piezoelectric element 6b.

Alternative embodiment would be to monitor the amount of electric current pumped to the piezoelectric element 6b and the voltage across the piezoelectric element 6b. When the rate of the change of voltage is decreased below set threshold, the depolarization threshold is determined.

It is obvious to the skilled person that, along with the technical progress, the basic idea of the embodiment can be implemented in many ways. The invention and its embodiments are thus not limited to the examples described above but they may vary within the contents of patent claims and their legal equivalents.

LIST OF REFERENCE NUMERALS

C capacitor
D diode
SW1, SW2, SW3, SW4 controlled switch
RFB1, RFB2 resistor
P1, P2 electrical connection
1 device surface
2 adhesive
3 conductive layer
4 adhesive
5 carrier
6a electrically conductive carrier (e.g. metal plate)
6b piezoelectric element (e.g. piezo ceramic)
7 opening/deflection space
8 conductive adhesive
9 contact point
10 haptic signalizing device
20, 30 driving circuit
21 microcontroller
22 booster

The invention claimed is:

1. A haptic signalizing device, comprising:
   a number of piezoelectric elements arranged below a device surface such that mechanical deformations caused by a converse piezoelectric effect in at least one piezoelectric element make the device surface to move such that the device surface follows the piezoelectric element; and
   a driving circuit configured to cause the converse piezoelectric effect on the at least one piezoelectric element by generating an alternating electric field over the piezoelectric element in a bipolar fashion, that is, consecutively in both the same and an opposite direction with a respect to the polarization of the piezoelectric element, to make the piezoelectric element to move beyond its initial position consecutively in both directions;
   wherein a depolarization limit is determined by the haptic signalizing device by using the piezoelectric element to detect when an electrical field, which is in the opposite direction with a respect to the polarization of the piezoelectric element, starts to depolarize the piezoelectric element;
   wherein the driving circuit is configured to cause the converse piezoelectric effect on the at least one piezoelectric element by generating the alternating electric field over the piezoelectric element so that a magnitude of a component of the alternating electric field which is driven to the opposite direction with the respect to the polarization, is based on the determined depolarization limit; and
   wherein the driving circuit is configured to cause the converse piezoelectric effect on the piezoelectric element by generating the alternating electric field over the at least one piezoelectric element so that a magnitude of the component of the alternating electric field, which is driven to the same direction with the respect to the polarization, is based on a level where a short circuiting starts to occur at the piezoelectric element.

2. The haptic signalizing device of claim 1, wherein the depolarization limit is based on a point where transduction efficiency starts to drop.

3. The haptic signalizing device of claim 1, wherein the depolarization limit is configured as a minimum voltage for the driving circuit so that the driving circuit is configured to maintain voltage above the minimum voltage when driving the piezoelectric element.

4. The haptic signalizing device of claim 1, wherein the component of the alternating electric field that is in the opposite direction with respect to the polarization of the piezoelectric element is kept at or below the depolarization limit of the piezoelectric element in each operating temperature, and the depolarization limit is configured as the point at which rate of change of an electric current pumped to the piezoelectric element increases above a set or predetermined threshold.

5. The haptic signaling device of claim 1, wherein the depolarization limit is determined by the haptic signaling device by using the piezoelectric element to measure its mechanical deformations for determining the magnitude of the component of the electrical field that is in the opposite direction with respect to the polarization of the piezoelectric element based on or as the point where the transduction efficiency decreases; and the mechanical deformations are measured by measuring the voltage over the piezoelectric element, which correlates with the mechanical deformation.

6. The haptic signaling device of claim 1, wherein the component of the electric field, which is driven to the same direction with respect to the polarization, is based on a level where breakage of insulation starts to occur at the piezoelectric element.

7. The haptic signaling device of claim 1, wherein the level where the short circuiting or the breakage starts to occur is configured as a maximum voltage for the driving circuit so that the driving circuit is configured to maintain voltage below the maximum voltage when driving the piezoelectric element.

8. The haptic signaling device according to claim 1, wherein: the haptic signaling device is configured to set the component of the alternating electric field that is in the opposite direction with respect to the polarization of the piezoelectric element depending on temperature, such that in a lower temperature the component of the alternating electric field is stronger and in a higher temperature the component of the alternating electric field is weaker, such that the weakening takes into account a temperature change, to keep the alternating electric field over the piezoelectric element below a determined or set depolarization limit.

9. The haptic signaling device of claim 1, wherein: the haptic signaling device is configured to adapt the alternating electric field over the piezoelectric element depending on temperature, to obtain a larger haptic signal from the haptic signaling device in lower temperatures than from higher temperatures or to compensate for temperature change in stiffness or elasticity of the device surface in the haptic signaling.

10. The haptic signaling device of claim 1, wherein the piezoelectric element is arranged:
to locally move the device surface inwards when the mechanical deformation in the piezoelectric element is a deflection directed away from the device surface; and
to locally move the device surface outwards when the mechanical deformation in the piezoelectric element is a deflection that is directed towards the device surface.

11. The haptic signaling device of claim 1, wherein: the piezoelectric element and the device surface are mechanically connected such that the device surface follows an inward movement of the piezoelectric element.

12. The haptic signaling device of claim 1, wherein: a mechanical connection between the device surface and the piezoelectric element also functions as an electrical connection between the piezoelectric element and the driving circuit.

13. The haptic signaling device of claim 1, comprising: a further electrical connection between the piezoelectric element and the driving circuit, namely an electrically conductive carrier of the piezoelectric element.

14. The haptic signaling device according to claim 1, wherein: the haptic signaling device is calibrated in a prevailing operating temperature before use, especially to compensate temperature change in stiffness or elasticity of the device surface in the haptic signaling.

15. The haptic signaling device of claim 1, wherein there is at least one booster controllable by the driving circuit for generating the alternating electric field over the piezoelectric element in the same direction with respect to the polarization of the piezoelectric element, and at least one further booster controllable by the driving circuit for generating the alternating electric field over the piezoelectric element in the opposite direction with respect to the polarization of the piezoelectric element, the drive circuit comprising a number of capacitors and controllable switches that can be opened and closed by the driving circuit.

16. The haptic signaling device of claim 1, wherein there is one booster controllable by the driving circuit for generating the alternating electric field over the piezoelectric element in both the same and the opposite direction with respect to the polarization of the piezoelectric element, the driving circuit preferably comprising a number of capacitors and controllable switches that can be opened and closed by the driving circuit.

17. The haptic signaling device, according to claim 1, wherein the haptic signaling device is configured to calibrate the piezoelectric element before use, preferably such that the calibration takes into account a temperature change of the point at which rate of change of an electric current pumped to the piezoelectric element increases above a set or predetermined threshold.

* * * * *